United States Patent
Bellows

(10) Patent No.: US 9,760,919 B2
(45) Date of Patent: Sep. 12, 2017

(54) PREVENTING PURCHASED MERCHANDISE FROM BEING LEFT AT A CHECKOUT COUNTER

(71) Applicant: SYMBOL TECHNOLOGIES, INC., Schaumburg, IL (US)

(72) Inventor: David E. Bellows, Wantagh, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 582 days.

(21) Appl. No.: 14/016,505

(22) Filed: Sep. 3, 2013

(65) Prior Publication Data
US 2015/0060543 A1 Mar. 5, 2015

(51) Int. Cl.
*G06Q 30/00* (2012.01)
*G06Q 30/06* (2012.01)

(52) U.S. Cl.
CPC .................................... *G06Q 30/06* (2013.01)

(58) Field of Classification Search
CPC .... G06Q 20/20; G07G 1/0054; G07G 1/0045; G06K 19/0723
USPC .......................................... 235/383, 385, 492
See application file for complete search history.

(56) References Cited

U.S. PATENT DOCUMENTS

| | | | |
|---|---|---|---|
| 5,426,282 A * | 6/1995 | Humble | 235/383 |
| 6,747,560 B2 | 6/2004 | Stevens, III | |
| 6,924,743 B2 | 8/2005 | Conzola et al. | |
| 7,005,988 B2 | 2/2006 | Mathewson, II et al. | |
| 7,081,818 B2 | 7/2006 | Eckstein et al. | |
| 7,619,525 B2 | 11/2009 | Kwan | |
| 7,780,081 B1 * | 8/2010 | Liang | 235/383 |
| 7,920,063 B2 | 4/2011 | Ulrich | |
| 8,374,926 B2 * | 2/2013 | Solomon | 705/28 |
| 8,577,759 B2 * | 11/2013 | Solomon | 705/30 |
| 2005/0046570 A1 * | 3/2005 | Conzola et al. | 340/568.1 |
| 2007/0037614 A1 | 2/2007 | Rosenberg | |
| 2008/0210756 A1 | 9/2008 | Minerley | |
| 2010/0187306 A1 * | 7/2010 | Solomon | 235/385 |
| 2011/0153614 A1 * | 6/2011 | Solomon | 707/740 |
| 2012/0047050 A1 * | 2/2012 | Solomon | 705/28 |
| 2012/0203572 A1 | 8/2012 | Christensen | |
| 2012/0271742 A1 * | 10/2012 | Solomon | 705/28 |
| 2012/0280040 A1 | 11/2012 | Carney et al. | |
| 2012/0320214 A1 * | 12/2012 | Kundu et al. | 348/150 |
| 2013/0127616 A1 | 5/2013 | Robitaille | |

\* cited by examiner

*Primary Examiner* — Paultep Savusdiphol
(74) *Attorney, Agent, or Firm* — Yuri Astvatsaturov

(57) ABSTRACT

A system and method to prevent merchandise from being left at a checkout counter includes a first step of entering a checkout area with a group of items having identification tags. A next step includes reading the tags of the items in the group. A next step includes associating the tagged items as a group. A next step includes detecting whether any tagged item is separated from the group. A next step includes generating an alert if any tagged item is separated from the group.

15 Claims, 2 Drawing Sheets

PREVENTING PURCHASED MERCHANDISE FROM BEING LEFT AT A CHECKOUT COUNTER

BACKGROUND

A significant issue that retailers face is customers leaving behind paid merchandise at the checkout counter. This typically happens when a consumer doesn't see one of his bags of goods and leaves without it or when the cashier forgets to bag an item that is then left behind when the shopper takes all of his bagged merchandise. Most often, the customer realizes that he is missing the paid merchandise well after he has left the store, so he then has to travel back to the store and explain to customer service how some of his paid merchandise was left behind. In order for the store to confirm the customer's story, the store's security department has to spend the time to tediously look for the video footage of the event (appropriate camera, correct day, time, etc) and then carefully review it to make sure that the merchandise was indeed paid for but accidentally left at the store. This time-consuming step verifies that the customer has a legitimate story and is not attempting to cheat the retailer by conjuring up a lie in order to steal merchandise. The store then needs to figure out what happened to the missing merchandise. Did the next customer in line take it? Was the merchandise put back on the shelf? Was it set aside at customer service? Did the cashier take the product for himself? Did the merchandise get lost? There are many possibilities, making it even more difficult to resolve the matter. As a result, many times the customer is not reunited with his merchandise. The above scenarios present lengthy and error prone processes that are difficult to confirm and resolve and are therefore non-productive for the store's employees and make the experience poor for the customer.

One solution to these problems is to provide manual inspection, such as having someone always monitoring the store checkout counter, which wastes productivity. Another solution is electronic tracking of items with users. At present, there are many techniques for the electronic monitoring of the movement of people and stock, which can be used in many different scenarios in a retail environment. These monitoring techniques include the scanning or reading of any one of a barcode printed on an item, an Electronic Article Surveillance (EAS) tag affixed to the item, a Radio Frequency Identification (RFID) tag embedded in the item, and the like. Even with these techniques to track items, there is still a problem for tracking users where purchased items still can be separated from their buyers and left behind at a checkout counter unintentionally.

Accordingly, there is a need for an improved technique to alleviate the aforementioned issues.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
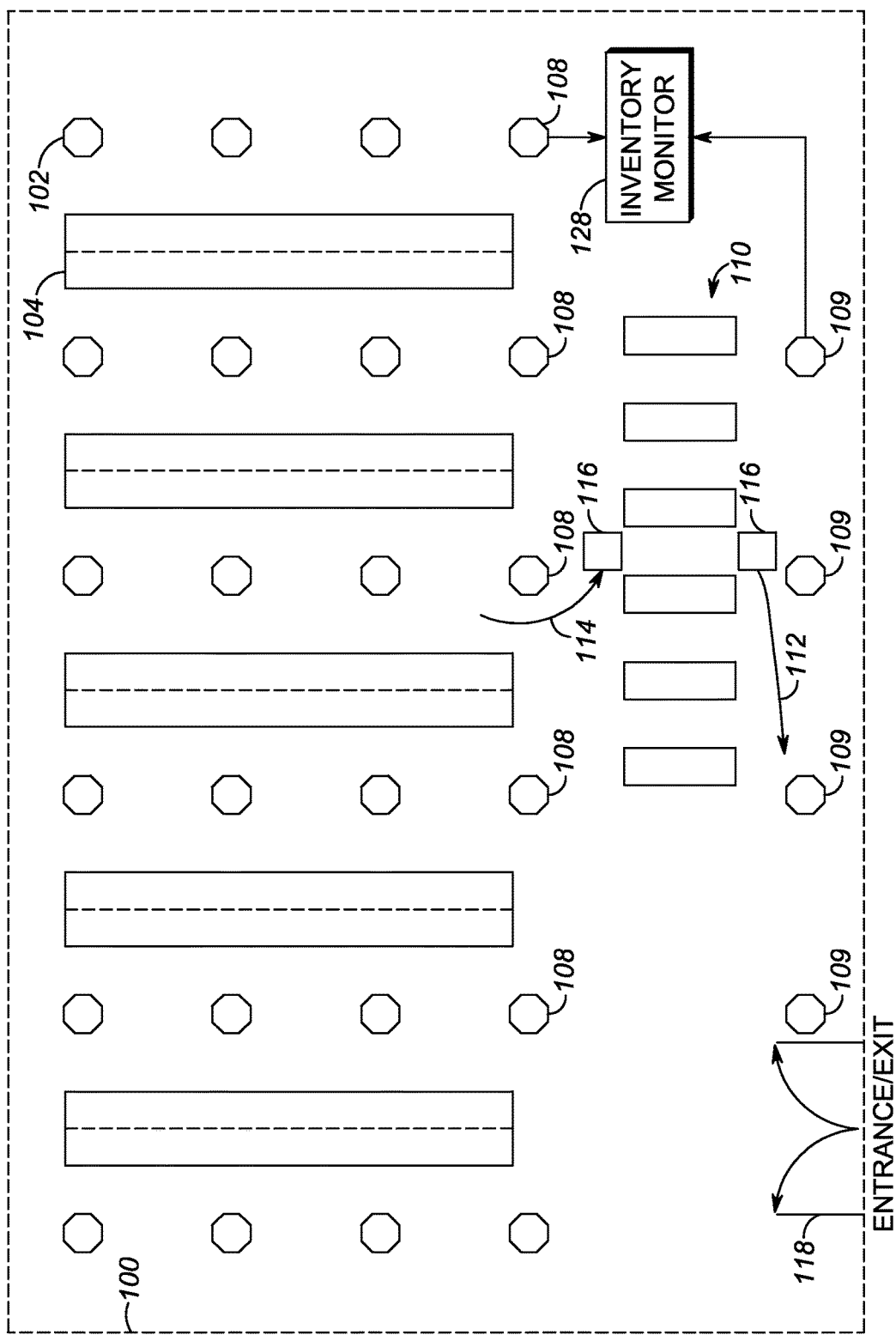
FIG. 1 is a simplified plan view of a system in a store, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The present invention provides a technique to use item detectors at a retailer's checkout and between the checkout and exit to determine whether a group of tagged merchandise is being split up. For example, the present invention identifies whether some merchandise of the group is on its way out of the store while other merchandise of the group is still at the checkout lane. In this way, the present invention describes a system comprising a plurality of item detectors used to prevent purchased merchandise from being left at a retailer's checkout lane. The present invention is independent of specifically tracking the customer, in that there is no need to link the group of merchandise to a customer in order to resolve the problem. The present invention proposes a system that gives real-time visibility to the retailer and the customer in order to prevent purchased merchandise from being left behind in the store.

FIG. 1 is a plan view depiction of a store incorporating a system in accordance with the present invention. Various entities are shown that are adapted to support the inventive concepts of the embodiments of the present invention. Those skilled in the art will recognize that FIG. 1 does not depict all of the equipment necessary for the system to operate but only those system components and logical entities particularly relevant to the description of embodiments herein. For example, scanning terminals, detectors, checkout kiosks, inventory control systems, tracking devices, and wireless access points can all include processors, communication interfaces, memories, etc. In general, components such as processors, memories, and interfaces are well-known. For example, processing units are known to comprise basic components such as, but not limited to, microprocessors, microcontrollers, memory cache, application-specific integrated circuits, and/or logic circuitry. Such components are typically adapted to implement algorithms and/or protocols that have been expressed using high-level design languages or descriptions, expressed using computer instructions, expressed using messaging logic flow diagrams.

Thus, given an algorithm, a logic flow, a messaging/signaling flow, and/or a protocol specification, those skilled in the art are aware of the many design and development techniques available to implement a processor that performs the given logic. Therefore, the entities shown represent a known system that has been adapted, in accordance with the description herein, to implement various embodiments of the present invention. Furthermore, those skilled in the art will recognize that aspects of the present invention may be implemented in and across various physical components and none are necessarily limited to single platform implementations. For example, the inventory monitoring aspect of the present invention may be implemented in any of the devices listed above or distributed across such components. It is within the contemplation of the invention that the operating requirements of the present invention can be implemented in software, firmware, or hardware, with the function being implemented in a software processor (or a digital signal processor) being merely a preferred option.

It is envisioned that the system of the present invention can use various local and wide-area communication networks for various purposes. For example, an exclusive IEEE 802.11 wireless communication network can be used in the store. However, it should be recognized that the present invention is also applicable to other wireless communication systems including cellular, Wi-Fi™ Bluetooth™, and other communication networks including IEEE 802.xx-based protocols employing wireless technologies such as IEEE's 802.11, 802.16, or 802.20, any of which being modified to implement embodiments of the present invention.

The present invention can also include wireless identification and detector systems. For example, a Radio Frequency Identification (RFID) system can be used for inventory management in the store. Alternatively, an Electronic Article Surveillance (EAS) tag reader or personal shopping scanning terminal can be used to identify and detect tagged items in the store. However, although the present invention is described in terms of an RFID system, it is equally applicable to any sensing network, and any type of item identification system can be used as an item detector.

Referring back to FIG. 1, a user can enter a defined area 100. For example, the user can be a customer entering the defined area 100 of a retail store. The user will be picking up items from a plurality of shelves 104, as well as from racks and other displays, within the defined area 100. These items can be tagged with RFID identification tags, for example. If the items to be retrieved are small or few in number, the user can move about the defined area without any item carrier 116. However, if the items are large or many in number the user can pick up an optional item carrier 116. Item carriers could include a shopping cart, basket, or bag in a grocery store or department store. As used herein, item carrier 116 can refer to a shopping cart, basket, bag, or the user himself.

It is envisioned that the store may be utilizing a plurality of existing item detectors 102, such as overhead RFID readers, to monitor item inventory within the store. These item detectors 102 can be used to detect the movement of items within the store, and can report this information to an inventory monitor 128. Either existing overhead RFID readers can be adapted to perform the item detector function of the present invention, or dedicated item detectors can be provided solely for purposes of the present invention. As explained above, the item detector can be an RFID reader, EAS reader, personal shopping scanning terminal, or any other type of item identification system. In addition, an existing inventory monitor 128 can be used for purposes of the present invention, or a dedicated inventory monitor can be supplied.

In the example shown, a user will enter a store 100 and start shopping for items, picking items from the shelves 104, as well as from racks and other displays. The items in the store are tagged with identification tags, such as RFID tags in this example. When the user has completed shopping, the user (i.e. item carrier 116) will move 114 to the checkout area 110. In this example, there are at least two item detectors 108 located in the vicinity of the checkout area 110, and all of his RFID tagged merchandise is physically grouped together (in carrier 116). Note that the item detectors 108 in FIG. 1 could also have been depicted directly over checkout area 110. The item detectors 108 can read all the physically co-located items in the carrier as a group. The item detectors 108 can also read all the items during the checkout process and associate them as a group as they are removed from item carrier 116 and then bagged for the customer. The reading can be achieved by either a single item detector or by multiple item detectors working together where each reads a portion of the total. The item detectors provide the inventory monitor 128 with a list of these items in that group. If there are existing item detectors 102 in the store that have already been tracking and reporting the items to the inventory monitor as the customer has been shopping, the item detector(s) 108 near or at the checkout area will read all the physically co-located items in the carrier as a group and simply verify the already known contents of the carrier to the inventory monitor.

During checkout, a customer may wish to add or subtract items from his purchase. Therefore, the present invention provides an option for a cashier or store employee to redefine the group, adding or subtracting items from the group manually, and reporting this to the inventory monitor. For example, the act of adding or subtracting an item to or from the transaction using the point of sale register itself can be used to modify the group membership.

After checkout, the customer takes all of his purchased goods in the item carrier 116 and heads 112 to the exit where several more item detectors 109 can be located along the way. As the customer approaches each new overhead RFID reader 109 along his path 112 to the exit 118, his purchased RFID tagged merchandise is subsequently detected from reader to reader 109, indicating that the customer is on the move, and reported by each detecting reader 109 to the inventory monitor 128. However, if the customer forgets any individual item or even an entire bag of merchandise when he walks away from the checkout lane and heads for the exit, only the items he is carrying in carrier 116 are read by the overhead RFID readers 109 along his path 112 to the exit. The forgotten items left at the checkout lane will continue to be read by the overhead RFID reader(s) 108 located in the vicinity of the checkout lane/counter/area and reported to the inventory monitor 128. The inventory monitor 128 will note this discrepancy, indicating that some of the checkout merchandise has been separated from the rest of the group.

Upon noting such as discrepancy, the inventory monitor 128 can generate an alert that the customer has forgotten purchased merchandise in the store. The alert can be in any number of various forms and can be delivered to the customer and/or an employee before the customer actually leaves the store. In one example, the inventory monitor can generate an audio and/or visual alert to notify the cashier that performed the checkout of the particular group of merchandise, whereupon the cashier can then flag the customer down. In another example, an alert can be sent to an employee stationed at the store's exit to notify the customer. Another example includes communicating with the customer directly by sending a text message to the customer's phone using an available wireless communication network, as previously described. It is envisioned that the customer will have previously signed up for such a service. Another example includes communicating with the customer directly by sending a voice call to the customer's phone using an available wireless communication network, as previously described. It is envisioned that the customer will have previously signed up for such a service. In the event the customer doesn't get or respond to the immediate notification, the store will at least be aware of what happened and will have an immediate record of the event that can be followed up with the customer. By simply knowing that paid merchandise was left behind by a customer, the store can at minimum set the merchandise aside so it isn't misplaced or stolen, and the customer can be contacted to pick it up.

In an alternative embodiment using an existing overhead RFID reader system, the inventory monitor can associate the items as a group moving together through the store using an identified item carrier 116. For example, a shopping cart can have its own RFID tag or other identifier, and when the customer places an item in the cart, it is then associated as a group item with that cart identifier. When the cart 116 moves 114 to the checkout area, a scanning terminal need only scan the item carrier 116 identifier to identify the associated group of items to the inventory monitor 128. If the cart is identified by an electronic tag such as an RFID tag, then an RFID reader need only read the item carrier 116 identifier to identify the associated group of items to the inventory monitor 128. Of course any other indicia reading technique can be used to identify the cart in this way. After checkout, each item being carried by the item carrier 116 can be detected again by one or more of the item detectors 109. For example, the customer takes all of his purchased goods in the item carrier 116 and heads 112 to the exit. As the customer approaches each new overhead RFID reader along his path 112, his purchased RFID tagged merchandise is subsequently detected from reader to reader, indicating that the customer is on the move, and reported to the inventory monitor 128. However, if the customer forgets any individual item or even an entire bag of merchandise when he walks away from the checkout lane and heads for the exit, only the items he is carrying in carrier 116 are read by the overhead RFID readers 109 along his path 112 to the exit. The forgotten items left at the checkout lane will continue to be read by the overhead RFID reader(s) 108 located in the vicinity of the checkout lane/counter/area. If any of the items are separated from their group, then this discrepancy can be displayed and an alert can be generated as before.

Figure 2:
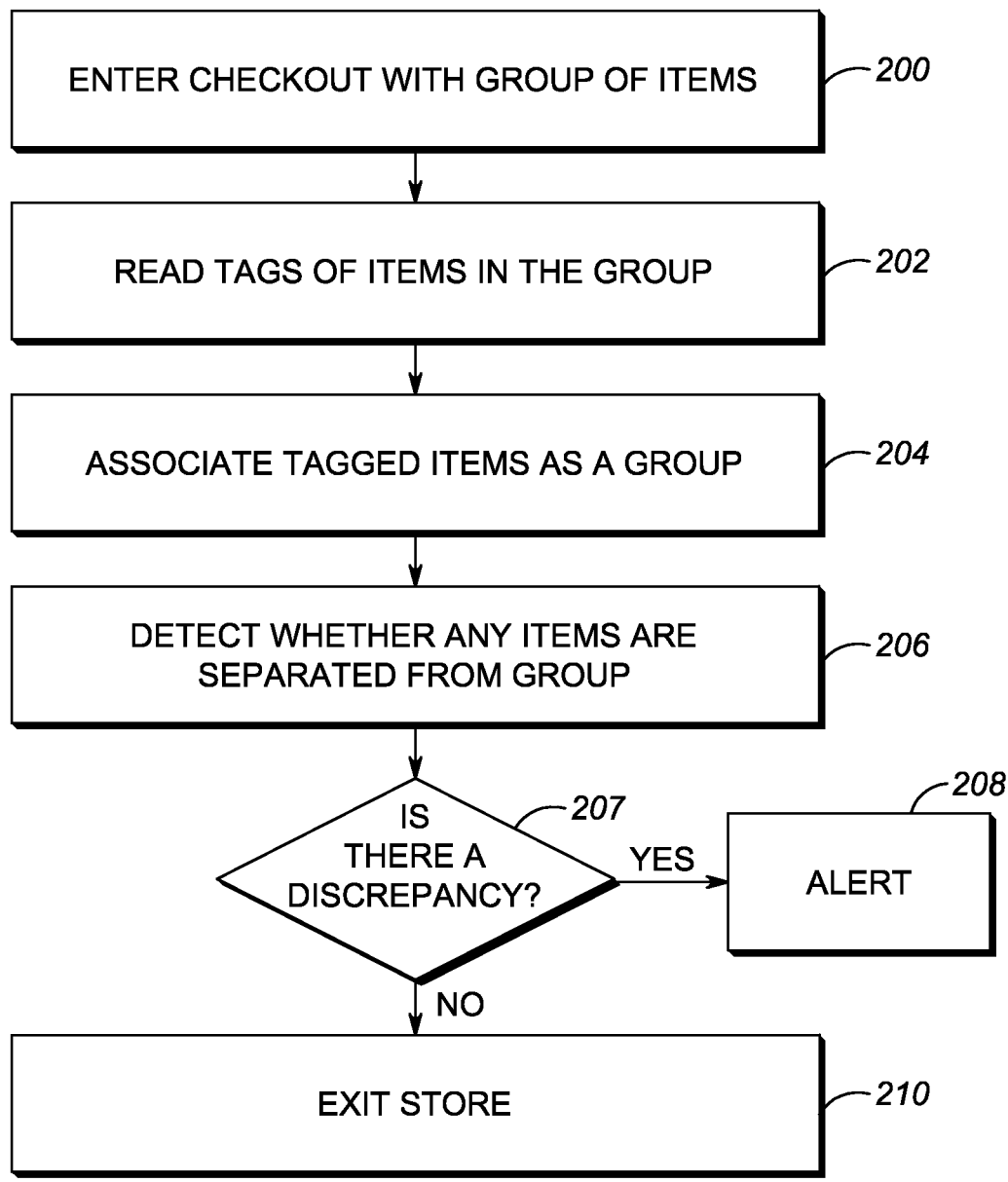
FIG. 2 is a simplified flowchart of a method, in accordance with the present invention.

FIG. 2 illustrates a flowchart of a method to prevent merchandise from being left at a checkout counter, in accordance with the present invention. The method includes a first step 200 of entering a checkout area with a group of items having identification tags.

A next step 202 includes reading the tags of the items in the group by at least one item detector in the store, such as an overhead RFID reader.

A next step 204 includes associating the tagged items as a group.

A next step 206 includes detecting whether any tagged items are separated from the group. This step optionally includes redefining the group during checkout by adding or subtracting items from the group manually. In practice, detecting includes subsequent detecting of the group after checkout, to detect whether any tagged item has become separated from the group. For example, if there are group items that are still being read by the original checkout area's item detector(s) while other group items are being read along the path to the exit, then a separation of the group has occurred. It is not necessary to read the entire group as it moves towards the exit. The trigger is reading some of the group items by readers 109 along the path to the exit while one or more of the group items are still being read by the original checkout area readers 108. If nothing is left behind, then no members of the group should still be read by a checkout reader while the merchandise moves towards the exit. Alternatively, the same reader with sufficient range may be used to detect that there are some items from the group still at the original checkout area while other group items are heading for the exit at the same time.

A next step 208 includes generating an alert if any tagged item is separated from the group, i.e. there is a discrepancy 207 where subsequent readings of the group produces a lesser number of items in the group or some items of the group are being read by one reader while other items of the group are being read by another reader in a different area. One example of this is reading a group item(s) on readers 109 while other group item(s) are read on reader 108. This step can include generating an alert notifying the cashier that performed the checkout of the group. This step can also include generating an alert notifying an employee stationed at the store's exit. This step can also include communicating with the customer directly, such as by a text message or voice call. This step can also include setting aside any items separated from the group for pick up by the customer.

The detecting and alert generating steps 206, 208 are performed during and after checkout until the items in the group are no longer detected. If there is no discrepancy within the group the customer can exit the store 210 normally.

Advantageously, the present invention gives real time visibility to the retailer and the customer in order to prevent the merchandise from being left behind in the first place. This simplifies the retailer's responsibilities and makes for a better customer experience.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method to prevent merchandise from being left at a venue, the method comprising:
    associating multiple items in a first area of the venue as a group by reading tags of the multiple items with at least one item detector in the venue;
    detecting whether at least one of the multiple items is separated from the group by reading, with the at least one item detector in the venue, at least one tag of the multiple items in the group in a second area of the venue while reading, with the at least one item detector in the venue, at least another tag of the multiple items in the group in the first area of the venue; and
    generating an alert when the at least one of the multiple items is separated from the group.

2. The method of claim 1, wherein detecting and generating are performed during and after checkout until the group of items is no longer detected.

3. The method of claim 1 further comprising redefining the group during checkout by adding or subtracting items from the group manually.

4. The method of claim 1, wherein detecting includes subsequent detecting of the group after checkout, to detect whether any tagged item has become separated from the group.

5. The method of claim 1, wherein reading is performed by at least one overhead RFID reader in the store.

6. The method of claim 1, wherein generating includes generating an alert notifying a cashier that performed checkout of the group.

7. The method of claim 1, wherein generating includes generating an alert notifying an employee stationed at a store's exit.

8. The method of claim 1, wherein generating includes communicating with a customer directly.

9. The method of claim 1 further comprising designating any items separated from the group for pick up by a customer.

10. The method of claim 1, wherein detecting includes reading at least one item of the group at a checkout counter while reading at least one other item of the group along a path to a store exit, indicating separation of the group.

11. A system to prevent merchandise from being left at a venue, comprising:
    at least one item detector located in vicinity of a checkout area in the venue, the at least one item detector operable to read identification tags on items entering the checkout area; and
    an inventory monitor operable to receive identification information from the at least one item detector and associate identified tagged items as a group;
    wherein the at least one item detector is further operable to perform subsequent detections of the identified tagged items, which is reported to the inventory monitor to detect whether any identified tagged item is separated from the group after checkout by reading, with the at least one item detector in the venue, at least one identification tag of the identified tagged items in the group in an area of the venue different from the checkout area while reading, with the at least one item detector in the venue, at least another identification tag of the identified tagged items in the group in the checkout area of the venue,
    whereupon the inventory monitor is further operable to generate an alert when any identified tagged item is separated from the group.

12. The system of claim 11 wherein the area is proximate to an exit from the venue.

13. A non-transitory computer readable medium having stored thereon computer executable instructions for preventing merchandise from being left at a venue, the instructions comprising:
    associating multiple items in a first area of the venue as a group by reading tags of the multiple items with at least one item detector in the venue;
    detecting whether at least one of the multiple items is separated from the group by reading, with the at least one item detector in the venue, at least one tag of the multiple items in the group in a second area of the venue while reading, with the at least one item detector in the venue, at least another tag of the multiple items in the group in the first area of the venue; and generating an alert when the at least one of the multiple items is separated from the group.

14. The non-transitory computer readable medium of claim 13 wherein the first area is a checkout area of the venue.

15. The non-transitory computer readable medium of claim 13 wherein the second area is proximate to an exit from the venue.

* * * * *